A. STUMP.
Churn.
No. 79,156.　　　　　　　　　　　　Patented June 23, 1868.
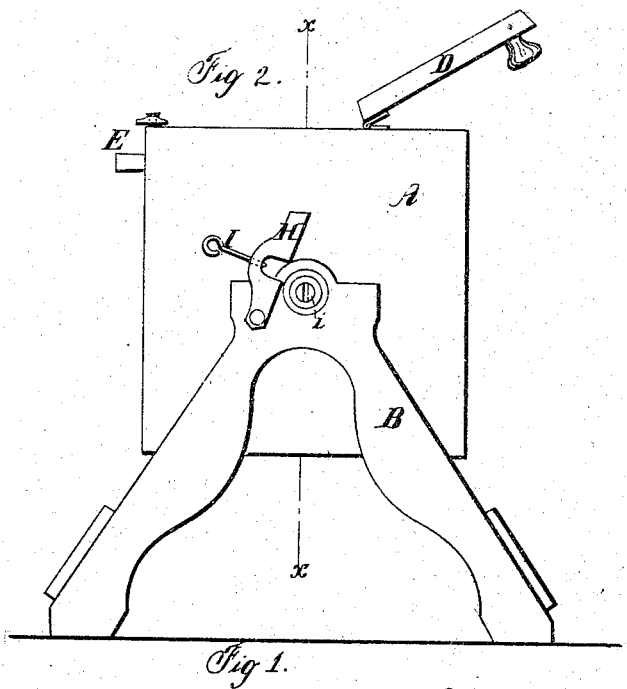
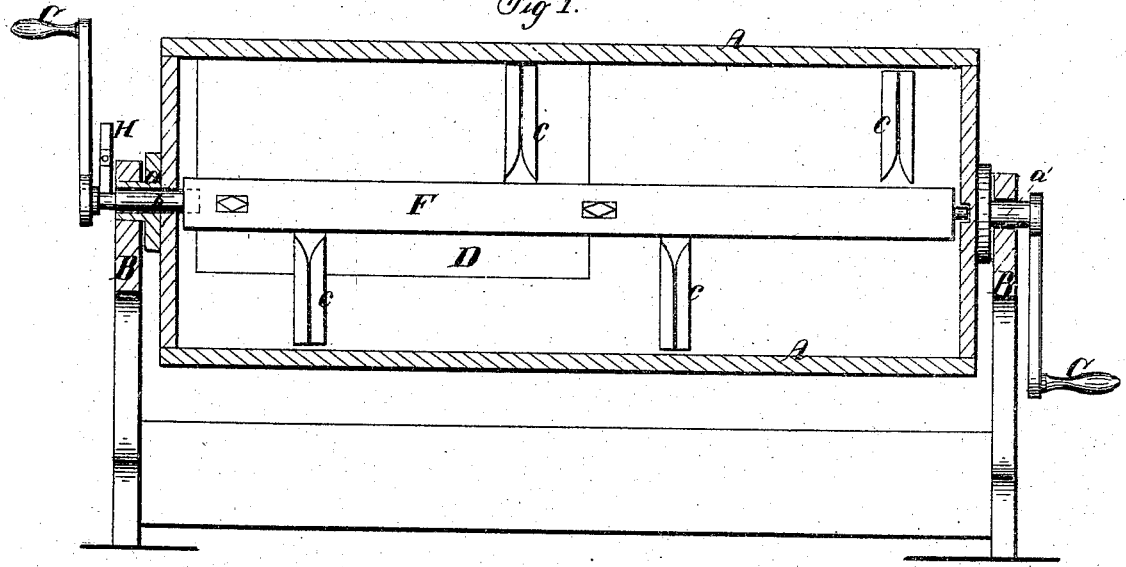
Witnesses  
Jno L Bovne  
Geo. H Strong
Inventor  
Andrew Stump  
Assigner to himself  
and Charles Colby  
By his Att'ys Dewey & Co

United States Patent Office.

ANDREW STUMP, OF BODEGA, CALIFORNIA, ASSIGNOR TO HIMSELF AND CHARLES COLBY.

Letters Patent No. 79,156, dated June 23, 1868; antedated June 6, 1868.

IMPROVEMENT IN CHURNS.

*The Schedule referred to in these Letters Patent and making part of the same.*

TO ALL WHOM IT MAY CONCERN:

Be it known that I, ANDREW STUMP, of Bodega, county of Sonoma, State of California, have invented an Improved Churn; and I do hereby declare the following description and accompanying drawings are sufficient to enable any person skilled in the art or science to which it most nearly appertains to make and use my said invention or improvements without further invention or experiment.

The object of my invention is to construct an improved churn, by which the cream can be thoroughly agitated, and speedily converted into butter, after which, by a simple contrivance, it can be gathered, or the particles brought together into a mass ready for working.

My invention consists of a long box of any desirable shape, but I prefer one whose cross-sections shall be square, as being the most effective. This box is supported horizontally, and revolves upon spindles at either end. A second shaft passes through the box, bearing arms, and is revolved by a crank in an opposite direction to the motion of the churn, until the butter is formed, when it is fastened so as to remain stationary while the box is revolved, thus bringing the particles together into a mass.

To more fully explain my invention, reference is had to the accompanying drawings, forming a part of this specification, of which—

Figure 1 is a side sectional elevation.

Figure 2 is an end view.

Similar letters of reference in each of the figures indicate like parts.

A is a churn, in the form of an oblong box, whose cross-section is a square. This box is supported horizontally upon the frame B B by the axles or spindles $a\ a$, upon which it is revolved by means of the crank C. A door or cover, D, serves to introduce and withdraw the cream or butter, while the buttermilk is drawn off by the opening at E.

The axle $a$ is made hollow, and has the smaller axle $b$ passing through it, and actuating the longitudinal shaft F, which has projecting from it the arms $c\ c$. This shaft is turned in a direction opposite to the motion of the churn A, by means of the crank, G.

By means of these opposite motions, the cream can be thoroughly agitated, and converted into butter in a very short time. When this is done, the butter will be scattered through the milk in small particles, which can be gathered by withdrawing the shaft F, and revolving the box A slowly for a short time. The axle $b$ is retained in place by the clasp H, which shuts down over it, and by means of a shoulder prevents it from slipping out. After withdrawing the shaft F, the axle $b$ is prevented from turning by the pin I, which is passed through the cap H, and the axle at $i$, or the shaft F may be left in the churn, and kept stationary, as described, when gathering the butter.

Having thus described my invention, what I claim as new, and desire to secure by Letters Patent, is—

In combination with the revolving box A, the interior revolving shaft F and arms $c\ c$, together with the clasp H and pin I, the whole constructed and operating substantially as and for the purpose herein described.

In witness whereof, I have hereunto set my hand and seal.

ANDREW STUMP. [L. S.]

Witnesses:
J. L. BOONE,
C. W. M. SMITH.